L. P. MILLER.
INSECT EXTERMINATOR.
APPLICATION FILED AUG. 13, 1912.

1,070,830.

Patented Aug. 19, 1913.
2 SHEETS—SHEET 1.

Witnesses
W. S. McDowell.
R. M. Smith.

Inventor
Lewis P. Miller
By Victor J. Evans
Attorney

L. P. MILLER.
INSECT EXTERMINATOR.
APPLICATION FILED AUG. 13, 1912.

1,070,830.

Patented Aug. 19, 1913.
2 SHEETS—SHEET 2.

Witnesses
W. S. McDowell,
R. M. Smith.

Inventor
Lewis P. Miller
By Victor J. Evans
Attorney

COLUMBIA PLANOGRAPH CO., WASHINGTON, D. C.

UNITED STATES PATENT OFFICE.

LEWIS P. MILLER, OF HURON, SOUTH DAKOTA.

INSECT-EXTERMINATOR.

1,070,830.  Specification of Letters Patent.  Patented Aug. 19, 1913.

Application filed August 13, 1912. Serial No. 714,829.

*To all whom it may concern:*

Be it known that I, LEWIS P. MILLER, a citizen of the United States, residing at Huron, in the county of Beadle and State of South Dakota, have invented new and useful Improvements in Insect-Exterminators, of which the following is a specification.

This invention relates to insect exterminating machines, the object of the invention being to provide a machine adapted to be moved along between parallel rows of plants, and embodying rotary elements driven by one of the traction wheels of the truck forming part of the machine, said elements serving to whip or knock the insects off the plants and direct the same into an insecticide pan, where they are destroyed.

With the above and other objects in view, the invention consists in the construction, combination and arrangement of parts, as will be hereinafter more fully described, illustrated in the accompanying drawings, and pointed out in the claims hereunto appended.

Figure 1:
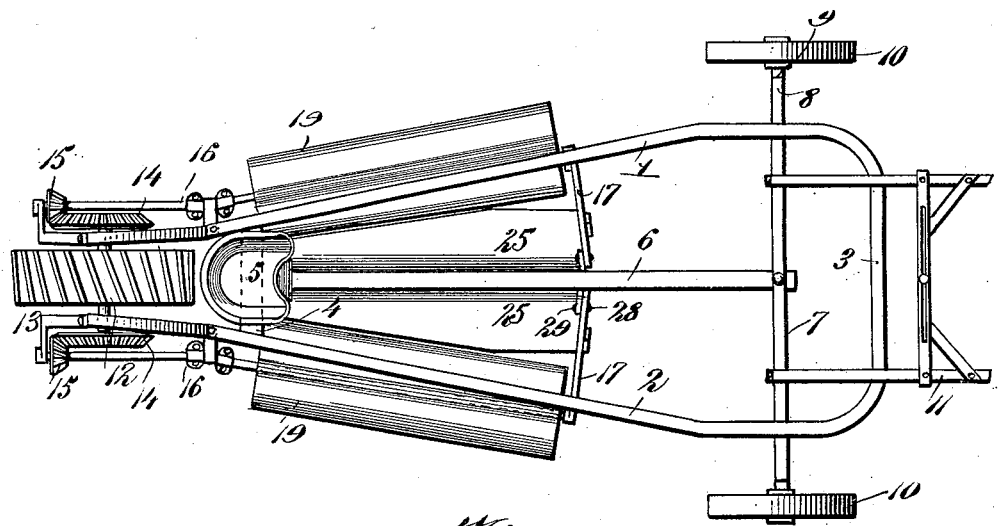
Figure 2:
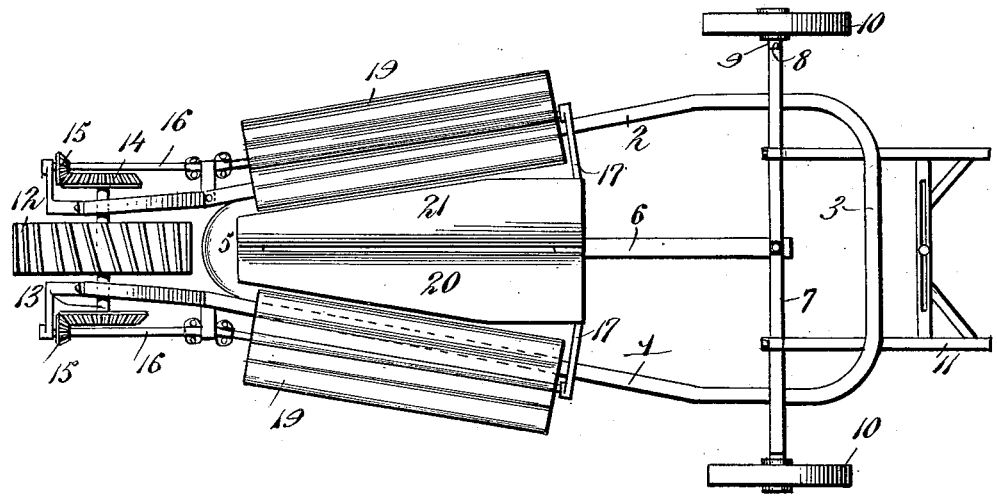
Figure 3:
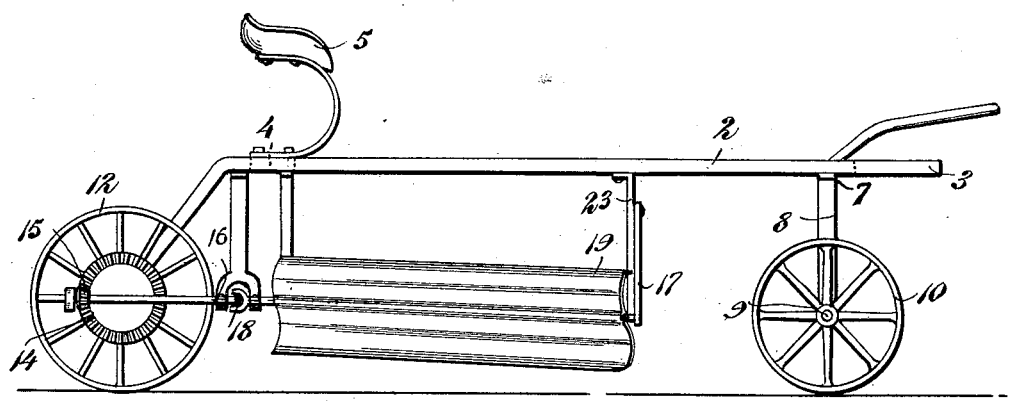
Figure 4:
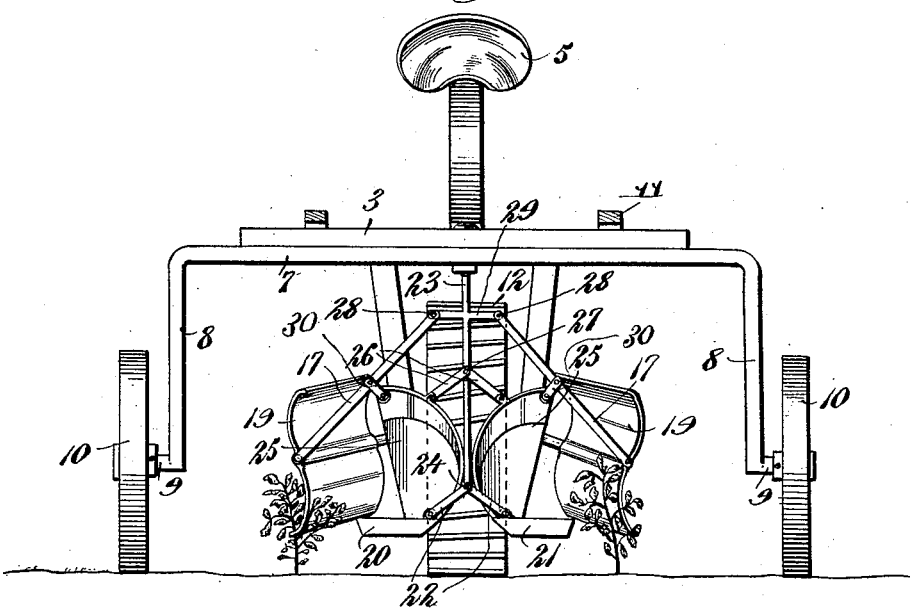

In the drawings: Figure 1 is a top plan view of a machine, embodying the present invention. Fig. 2 is a bottom plan view of the same. Fig. 3 is a side elevation of the machine. Fig. 4 is a front elevation of the machine.

The machine contemplated in this invention comprises a main frame, consisting of forwardly diverging side bars 1 and 2, connected at the front end by a forward cross bar 3, preferably formed in one piece with the side bars 1 and 2, as shown in Fig. 1, the side bars being further connected by an intermediate cross bar 4, upon which the driver's seat 5 is mounted. The frame may be further provided with a centrally and longitudinally extending reach bar 6 connecting the cross bar 4 with the axle 7. The axle 7 is located near the front of the machine, and provided with the downwardly extending end portions 8 having the spindles 9, on which the front carrying wheels 10 are journaled. The frame is shown as also provided with thills or shafts 11, to which a draft animal may be attached, the machine being designed to be drawn between rows of plants, as shown in Fig. 3, by a single draft animal, walking between said rows, while the wheels 10 straddle both rows, as shown in the same figure.

Mounted between the rear extremities of the side bars 1 and 2 is a rear traction wheel 12 supported on the rear axle 13. The axle 13 is journaled to turn in bearings in the bars 1 and 2, and is provided at its opposite ends with beveled gear wheels 14, which mesh with pinions 15 at opposite sides of the traction wheel, and on the rear extremities of tumbling shafts 16, said shafts extending well toward the front of the machine, and being journaled at their forward ends in the lower extremities of hangers or pendant brackets 17. Just in advance of the plane of the traction wheel 12, each of the tumbling shafts is provided with a universal or tumbling joint 18, as shown.

Mounted rigidly on each of the tumbling shafts, between the joint 18 and the hanger 17, is a rotary whipper or beater 19, the cross sectional shape of which is best illustrated in Fig. 3. Each beater consists of sheet metal, bent into sigmoidal shape in cross section, with the convex portion of each half of the blade arranged to move inward at the bottom toward the center of the machine, so as to whip or knock the bugs or insects off the oppositely arranged rows of plants toward the center of the machine into the insecticide pans provided for their reception.

Supported beneath the center of the machine is a two-part or sectional insecticide pan, embodying two independently adjustable sections 20 and 21, supported by links 22 from central uprights 23 each link 22 being connected to the upright 23 by a pivot joint at the point 24, thus enabling said pan sections to be moved toward and away from the center of the machine. This enables the pans to be adjusted in close relation to the rows of plants, according to the distance between the latter. Extending upward from and connected to the inner portion of each pan is a fender 25, substantially semi-cylindrical in cross section, so as to gather in and catch the insects, as they are whipped off the plants, and direct the same downward inside the sections of the insecticide pan, which pan sections are partially filled with some insecticide, such as kerosene which will destroy the insects, and also saturate them with an oil adapting them to be readily burned when heaped upon the field. It will be observed that the fenders 25 are also connected by arms 26 to the central support 23 by a pivot joint 27, thus enabling said fenders to be moved outward and inward with the sections of the pan, for the purpose above stated. The hangers 17 which are provided at their outer extremities with bearings for the tumbling shafts 16 are connected by pivot joints 28 to a horizontal cross head or support 29, so as to enable said hangers 17 to be moved outward and inward. Links 30 connect the arms 17 and fenders 25, as shown in Fig. 4.

It will now be seen from the foregoing description, taken in connection with the accompanying drawings, that it is practicable to vary the distance between the whippers, and also between the insecticide pans and fenders, so as to adapt the said parts to the distance between the rows of plants, thereby insuring the whipping of the insects into the pans, without scattering the same upon the ground.

The cross sectional shape of the whippers may of course be varied, as the exigencies of the case may require, or as experience may dictate, or other changes in the general construction of the machine may be resorted to, without departing from the principle, or sacrificing any of the advantages of the invention.

It will be understood from the description that the bugs are removed from the vines mechanically by the action of the revolving whippers. It will also be seen that the machine straddles the rows and never comes into contact with the vines to disturb the bugs except the whippers, which whip the bugs directly into the pans. These whippers are actuated by the interposed connections between them, and the traction wheel, thereby insuring the constant rotation of the whippers, which, it will be observed, move transversely of the rows. It will further be understood that the whippers may be adjusted toward and away from each other, in accordance with the condition and growth of the vines, so as to obtain the best results, and without knocking the bugs off the vines.

What is claimed is:

1. An insect exterminator, comprising a truck frame, supporting and traction wheels on which the truck frame is mounted, a sectional and divided insecticide pan supported by the truck frame, rotary whippers, tumbling shafts on which said whippers are mounted driven by the traction wheels, and means whereby said pan sections and whippers are coupled together and adapted for simultaneous adjustment toward and away from the center of the machine.

2. An insect exterminator, comprising a truck frame, supporting and traction wheels on which the truck frame is mounted, a sectional and divided insecticide pan supported by the truck frame, rotary whippers, tumbling shafts on which said whippers are mounted driven by the traction wheels, pivoted arms supporting said shafts, and means connecting the pan sections and tumbling shaft supporting arms whereby the pan sections and whippers are simultaneously adjustable toward and away from the center of the machine.

In testimony whereof I affix my signature in presence of two witnesses.

LEWIS P. MILLER.

Witnesses:
  E. H. VANCE,
  R. B. HILL.

---

Copies of this patent may be obtained for five cents each, by addressing the "Commissioner of Patents, Washington, D. C."